Feb. 13, 1962 P. V. KARPOVICH ETAL 3,020,639
METHOD AND APPARATUS FOR MEASURING ANGLES OF BODY JOINTS
Filed Oct. 14, 1960 3 Sheets-Sheet 2
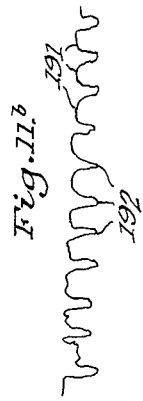
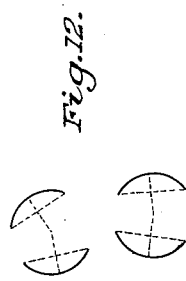
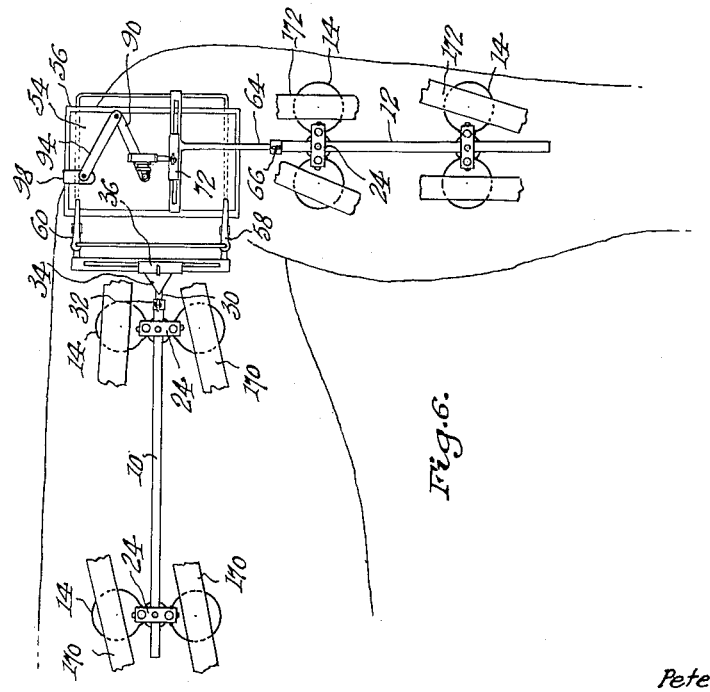
INVENTORS
Peter V. Karpovich
George P. Karpovich
BY
ATTORNEYS Feb. 13, 1962 P. V. KARPOVICH ETAL 3,020,639
METHOD AND APPARATUS FOR MEASURING ANGLES OF BODY JOINTS
Filed Oct. 14, 1960 3 Sheets-Sheet 3
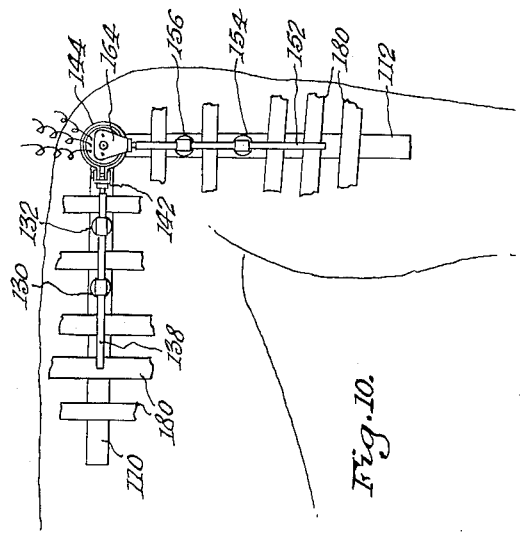
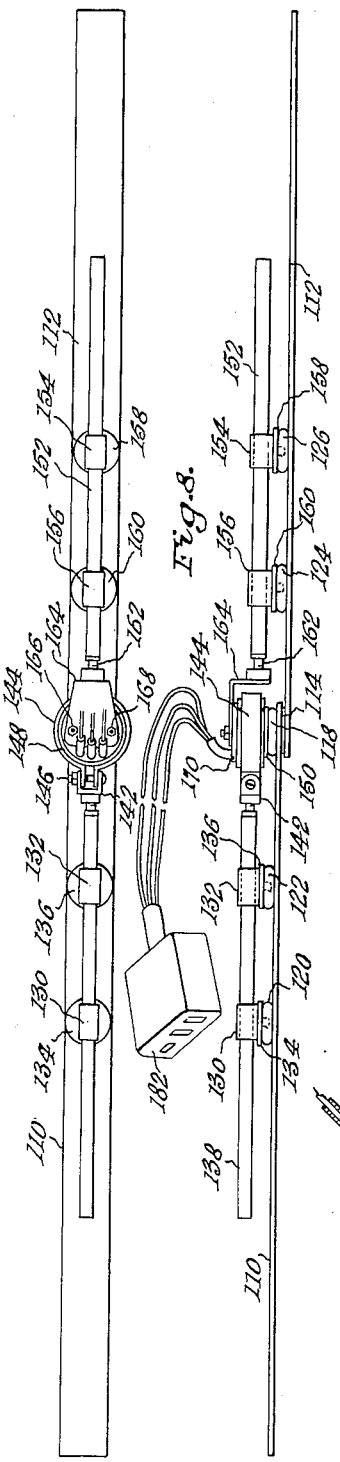
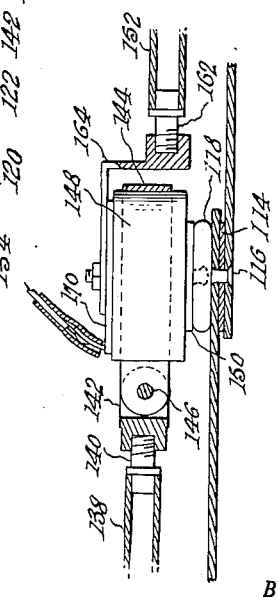
INVENTORS
Peter V. Karpovich
George P. Karpovich
BY
Joseph A. Hill
Boniford Hamilton
ATTORNEYS

# United States Patent Office 3,020,639
Patented Feb. 13, 1962

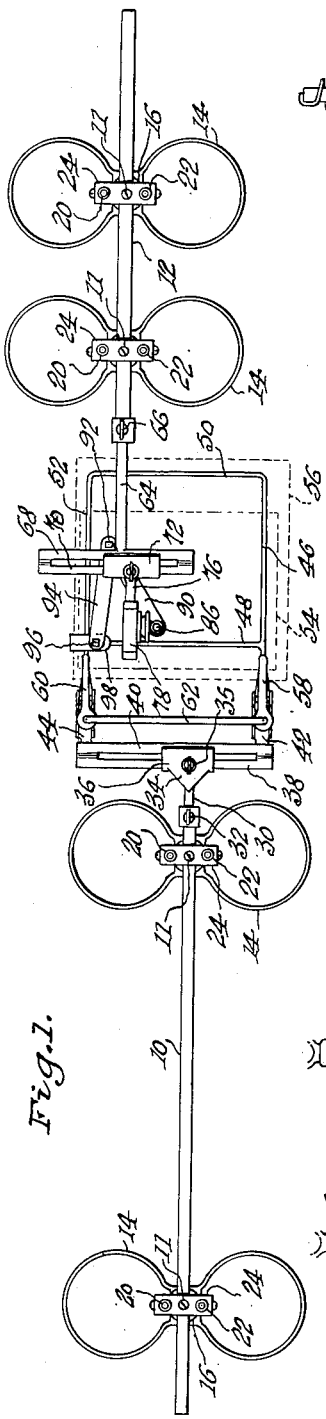

3,020,639
METHOD AND APPARATUS FOR MEASURING ANGLES OF BODY JOINTS
Peter V. Karpovich, Springfield, and George P. Karpovich, Longmeadow, Mass., assignors to the United States of America as represented by the Secretary of the Army
Filed Oct. 14, 1960, Ser. No. 62,817
3 Claims. (Cl. 33—1)

The present invention relates to anatomical goniometry and to studies of the flexing motion of various joints of the body during various physical movements. In particular, the present invention relates to a method by which a continuous, visual record of the motion of a joint can be made and to apparatus adapted to best practice the method.

The object of the present invention is to produce continuous recordable data of the angle formed by two members of a joint at any point of time during continuous flexing thereof due to normal physical activity.

Another object of this invention is to provide a device for determining the location of the pivotal axis of body joints such as the knee and elbow so that accurate motion data of the joint can be compiled.

Still another object of this invention is to provide a device for continually measuring the angle formed at a body joint during normal flexing thereof by providing an electrical potential the magnitude of which is proportional to the angle formed at the joint, which potential can readily be recorded by conventional electric recording devices. Additional objects and advantages of the present invention will occur to those skilled in the art from a reading of the following detailed description and drawings forming a part thereof, wherein:

FIG. 1 is a plan view of a device for determining the pivotal axis of a joint;

FIG. 2 is a side elevation of the center portion of the device of FIG. 1;

FIG. 3 is a side elevation partly in section taken on lines 3—3 of FIG. 1;

FIG. 4 is an end elevation of one of the four footings on the device of FIG. 1;

FIG. 5 is an elevation in section taken on lines 5—5 of FIG. 1;

FIG. 6 is a view of the device of FIG. 1 attached in operative position to the knee joint of a human body;

FIG. 7 is a plan view of a device for electrically indicating the angle formed by a body joint;

FIG. 8 is a side elevation of a device of FIG. 7;

FIG. 9 is a side elevation partly in section of the center portion of FIG. 8;

FIG. 10 is a view of the device of FIG. 7 attached in operative position to the knee of a human body;

FIGS. 11a, 11b and 11c are electrogoniograms of knee joints compiled in accordance with the present invention; and FIG. 12 is an illustration of the geometrical method for locating the pivotal axis of a joint in accordance with the present invention.

Referring now to FIGS. 1-6, a pair of sleeves 10 and 12 each have two adjustable footings connected thereto. Each adjustable footing is comprised of a double loop member 14 which is fabricated from a piece of wire or molded from suitable plastic material in a figure eight configuration so that the open loops are somewhat flexible to readily conform to the curvature of the part of the body to which the device may be attached. A washer 16 is located between each footing 14 and a bifurcated leg 17 and the three members are clamped together by a bolt 18 and nut 19. The bifurcated leg member 17 is fabricated from a length of tubular material by flattening the tube at the midpoint thereof, drilling a hole in the flattened portion to receive bolt 18, and bending the tube upwardly until the two legs 20 and 22 are parallel to each other. The legs 20 and 22 pass through bores in bracket 24 and are held in any desired position by set screws 26 and 28. Tube 10 also passes through a bore in bracket 24 perpendicular to the leg 17 and is secured in place by set screw 11. Each of the four footings 14 and associated structures secured to the two sleeves 10 and 12 is of identical construction.

A rod 30 is telescopically received in the sleeve 10 and can be set in any desired position by set screw 32. Rigidly secured to the end of rod 30 is a bracket comprised of triangular bracing member 34 and sleeve 36 which is split and conformed to accommodate tubular members 38 and 40. The tubular members 38 and 40 are clamped in position within the bracket by means of set screw 35.

The tubular members 38 and 40 are interconnected at each end by soldering or some other convenient means. Trunnion parts 42 and 44 of a clamp are rigidly connected to the transverse bars 38 and 40. A rectangular wire frame comprised of parts 46, 48, 50 and 52 is rigidly connected to the ends of trunnions 42 and 44. This composite structure, comprised of tubes 38 and 40, trunnions 42 and 44 and the wire frame, constitutes a rigid rectangular frame which is adjustable by means of set screw 35 transversely of the rod 30, and which supports a flat easel plate 56 which is secured to the frame. A record sheet 54 is clamped in position on the easel by spring biased clips 58 and 60 which are pivotally mounted on trunnions 42 and 44, respectively, and are interconnected by actuation bar 62.

A bracket 98 is rigidly connected by soldering or other suitable means at the junction of wires 48 and 52. A flat arm 94 is pivotally connected to the bracket 98 by bolt 96. A second flat arm 90 is pivotally connected to the first arm by a bolt 92 to form an elbow. The end of the second arm is rigidly secured to scriber sleeve 84. Since the arms 90 and 94 are flat, the elbow joints pivot on axes vertical to the easel so that the elbow remains in a plane substantially parallel to the record sheet 54, and the scriber sleeve 84 is maintained substantially perpendicular to the record sheet while being freely movable over the entire record sheet. A scribing instrument 86 is slidably received in sleeve 84 and is biased downwardly into engagement with the record sheet 54 by coil spring 88 which is attached to the sleeve 84. A projection 87 on the scriber 86 prevents the sleeve 84 from riding too near the record sheet. Another sleeve 82 freely slides along the scriber receiving sleeve 84 and has the male or stud portion of a snap fastener 81 soldered or otherwise connected thereto.

A rod 64 is telescopically received in sleeve 12 and can be set at any desired position by set screw 66. A first tube 68 is rigidly secured to the rod 64 and extends transversely thereof. A second tube 70 is disposed in parallel relation to the tube 68 and is connected at the ends thereof by welding, soldering or some other suitable means. Split sleeve clamp 72 embraces both tubes 68 and 70 and can be set at any desired point along the tubes by set screw 74. Tube 76 is connected to clamp 72 and extends substantially parallel to rod 64. A sleeve 78 embraces the tube 76. A female socket 80 of a snap fastener is affixed to sleeve 78 to provide a mating connection with male socket 81 carried by the scriber sleeve.

Referring now to the device shown in FIGS. 7-10, a pair of flat plate arm members 110 and 112 are separated by a washer 114 and pivotally interconnected by a brad pin 116. The female socket part of a snap fastener 118 is soldered or otherwise secured to the arm plate 110 with the socket aligned with the axis of pin 116. Similar female sockets 120 and 122 are soldered to plate 110 and female sockets 124 and 126 are soldered to plate 112. A pair of brackets 130 and 132 carry male studs 134 and 136, respectively, and embrace a tubular arm 138. The brackets are so spaced that the stud members can be mated with socket members 120 and 122 of the snap fasteners. The tubular arm 138 has a threaded stud 140 secured in the end thereof. A yoke 142 is threaded onto the stud. The yoke 142 is pivotally connected to a ring band 144 by a bolt 146. The ring band embraces a cup-shaped outer shell of a potentiometer 148. A male stud fastener 150 is secured by soldering or other means to the bottom of the housing 148 and is adapted to engage the female socket 118.

A second tubular arm 152 carries brackets 154 and 156 to which are secured stud fasteners 158 and 160, respectively, which are so spaced as to mate with sockets 124 and 126. A threaded stud 162 is secured in the end of the tube 152. A bracket 164 is threaded on the stud 162, and is connected by stud bolts and nut 166 and 168 to the center portion of the potentiometer.

The potentiometer per se is a commercially available item and comprises a resistance element embodied in the circular shell 148 and a sliding contact to vary the effective resistance of the potentiometer carried in the pivoting center section 170. When a circuit is completed through the sliding contact of the potentiometer, the magnitude of the potential of the circuit will vary in accordance with the position of the center pivoting section 170 with respect to the outer shell 148 and, since the tubular arms 152 and 138 are connected to the pivoting section and the outer shell, respectively, the magnitude of the potential across the potentiometer will vary according to the angle formed between these two tubular arms. Therefore, if the two arms are aligned with the limbs of a body joint, the potential across the potentiometer is a function of the angle between the two limbs of the joint.

In accordance with the present invention, the novel device of FIGS. 1-6 is used to determine the location of the axis of rotation of a joint. It can be used whether the axis of the joint is fixed, as in the elbow, or is shifting, as in the knee. Use of the device involves the utilization of the geometrical theorem: Given two arcs of a circle, the center of the circle is at the intersection of perpendicular bisectors to cords drawn through the arcs. In the case of shifting as migrating axis of rotation, such as the knee, the technique must be repeated through consecutive parts of the range of motion of the joint to determine the center of migration also. FIG. 12 shows illustrations of arcs scribed by the device with perpendicular bisectors erected to chords to indicate the pivotal axis.

The device can, for convenience of discussion, be considered in two parts, a record carrying part, being tube 10 and associated structure, and a scriber actuating part, being tube 12 and associated structure. In operation, either part can be secured to either limb of the joint under study.

The brackets 24 are spaced at optimum points along the tube 10 for the joint under study and secured in place by set screws 11. The height of the legs 17 are then adjusted by set screws 26 and 28 until when the footings 14 engage the limb, such as the thigh, the tube 10 lies in a plane substantially parallel to the plane in which the limbers of the joint pivot. The loops of the footings 14 are then taped to the thigh by adhesive tape strips 170. Although it is desirable, it is not essential that the tube 10 be aligned with the bone. The fundamental requirement is that the record paper remain substantially stationary with respect to the limb during locomotion of the joint. The rod 30 is then adjusted until the record paper is in the area of the pivotal axis and secured in position by set screw 32. The record paper can also be adjusted transversely of the rod 30 by operation of the clamp 36 and set screw 35.

The tube 12 is similarly attached to the calf of the leg by adjustment of the brackets 24 and legs 17 associated therewith, and the footings are taped to the calf by adhesive tape strips 172. The height of the legs is adjusted so that the tube lies in a plane parallel to that in which the joint members remain during locomotion, but is above the plane of tube 10 so that the snap fastener parts 80 and 81 can be mated. Telescoping rod 64 is set in position by set screw 66 and tube 76 is positioned transversely of rod 64 by moving clamp 72 and tightening set screw 74 until male stud 80 can be mated with female socket 81 and the scriber will remain over the record paper as the joint is flexed.

It will be noted that the device is fully adjustable in every direction and can readily be adapted for use on almost any joint of the human body or other animals. The footings can be adjusted in any position longitudinally for spacing, transversely for height, and radially if necessary to fit the footings to the curvature of the limb. The record sheet can be adjusted longitudinally and radially with respect to tube 10 by set screw 32, and transversely by operation of set screw 42. Similarly, all of the parts connected to tube 12 are fully adjustable. In addition, the snap fastener 80—81 permits pivotal motion of the tube 12 in any plane perpendicular to the record sheet to insure completely unbiased operation of the scriber, yet positively moves the scriber in response to articulation of tube 12 with respect to the record sheet.

After the device has been taped to the leg and adjusted, the leg is pivoted to either a straight or ninety degree angle. A clean record sheet is clipped to the easel and the scriber placed in contact with the sheet. The leg is then pivoted through the desired range, usually ninety degrees, which results in an arc being scribed on the record sheet. It is necessary that the scriber be off-center from the pivotal axis of the joint before an arc will be scribed. If the scriber does not move, the pivotal axis is located at the point of the scriber. The first arc will give a general indication of the location of the center. The starting point of the scriber is then shifted to another beginning point by adjustment involving the several set screws. It is preferable that the new starting point also be off-center by a substantial amount to provide a large arc to simplify geometrical calculations. Perpendicular bisectors are then erected to chords passed through the two arcs and the intersection of the bisectors represents the location of the pivotal axis of the joint.

After the center of the pivotal axis is found, the joint is placed in a reference position and a mark is made on the skin at the pivotal axis. The brad pin 116 of the electrogoniometer is then placed directly over the mark and the plate members 110 and 112 are aligned with the respective bones of the joint, as shown in FIG. 10. The plates are then secured to the limbs by strips of adhesive tape 180. The five male studs are then mated to the female sockets, which is easily accomplished because of the yoke and bolt arrangement 142—144 which permits first one leg and then the other to be connected. The electrical socket 182 is then connected to a suitable conventional electric circuit including a potential source and a means for recording the magnitude of the circuit potential imposed across the potentiometer as it fluctuates due to locomotion of the joint. The well known oscillograph is a suitable recording device.

FIG. 11a is an electrogoniogram of a normal knee during walking produced in accordance with the present invention. The upper limits 191 of the curves represent the 180 degree position and the lower limits 192 the acute angles. The deflections 194 indicate the shock absorbing flexing of the knee joint upon impact of the foot with the ground. FIG. 11b is a similar electrogoniogram produced from an artificial limb connected above the knee. The substantial absence of shock absorbing flexure will be noted. FIG. 11c is an electrogoniogram of a paralytic leg and is characterized by instability.

We claim:

1. A method for producing a visual record with respect to time of the motion of a joint of the body comprised of locating the approximate center of a projection of the pivotal axis of the joint on a record plane substantially parallel to the plane in which the body members of the joint move by striking at least two arcs on a record sheet held by mechanical means connected to one body member forming said joint with a scriber held by a mechanical extension attached to the other body member of said joint, geometrically erecting perpendicular bisectors to chords passed through said arcs, the intersections of said bisectors determining the location of the projection of the pivotal axis of said body joint, placing the pivot of a circular potentiometer to coincide with the approximate center of the projection of the pivotal axis of the body joint and attaching the sliding contact of the potentiometer to one body member forming the joint and the resistor of the potentiometer to the other body member forming the joint so that the position of the sliding contact on the resistance is a function of the angle formed by the body members of the joint, and continually producing a visual recording with respect to time of the electrical potential of a circuit including the potentiometer resistance and the sliding contact so that the magnitude of the potential indicates the angle formed at the joint at any point of time as the joint is flexed during normal exercise.

2. A device for locating the pivotal axis of an anatomical joint comprising first and second sleeves, a pair of brackets slidably mounted on each of said sleeves, locking means to secure each bracket in selected positions along its respective sleeve, a leg having two parallel elongated members adjustably connected to each of said brackets, said parallel elongated members passing on opposite sides of the respective sleeve and being disposed substantially perpendicular to the sleeve whereby said leg is adjustable transversely of said sleeve, a footing connected to one end of each of said legs comprised of a pair of loops adapted to be taped to the body, a first rod slidably received in said first sleeve and locking means to secure said first rod in any desired position in the sleeve, an easel adjustably connected to said first rod, said easel being adjustable transversely of said first rod, clip means connected to said easel for retaining a record sheet on said easel, a second rod slidably received in said second sleeve and locking means to secure said second rod in any desired position in said second sleeve, a scriber carrier arm adjustably connected to said first rod, said arm being adjustable both transversely and longitudinally of said second rod, a pivoted elbow linkage pivotally interconnecting said scriber carrier arm and said easel to retain said scriber carrier arm within a plane substantially parallel to said easel, a scriber carried by said scriber carrier arm, and spring biasing means to maintain said scriber in constant contact with a record sheet carried by said easel as said first and second rods move relative to each other due to flexing of a joint to which the device is attached.

3. A device for continuously measuring the instantaneous angle formed by a joint of the body comprising first and second elongated plate members pivotally interconnected at adjacent ends thereof, a plurality of female snap fasteners connected to and spaced along each plate member, a first and second rod pivotally interconnected at adjacent ends thereof by a potentiometer, said first rod being rigidly connected to the sliding contact of said potentiometer and the second rod being rigidly connected to the resistance thereof whereby the position of the sliding contact on the resistance is a function of the angle formed between said first and second rods, a plurality of male snap fasteners connected to each of said rods positioned to engage said female fasteners and thereby connect said first rod to said first plate and said second rod to said second plate whereby said plate members can be taped to a body joint with the pivoted connection thereof over the pivotal axis of the body joint so that said first and second rods can be fastened to said plates by said snap fasteners with said potentiometer over said pivotal joint so that the position of the sliding contact on the resistance of the potentiometer is a function of the angle formed at the body joint to which the plates are attached and the potential of a current passed through said sliding contact is an indication of the angle of the body joint.

No references cited.